(12) United States Patent
Kim

(10) Patent No.: US 7,762,530 B2
(45) Date of Patent: Jul. 27, 2010

(54) CABLE PULLER

(76) Inventor: Joseph Shinhyuk Kim, 1841 Columbine Dr., Yorkville, IL (US) 60560

( * ) Notice: Subject to any disclaimer, the term of this patent is extended or adjusted under 35 U.S.C. 154(b) by 0 days.

(21) Appl. No.: 11/467,555

(22) Filed: Aug. 26, 2006

(65) Prior Publication Data

US 2008/0048160 A1 Feb. 28, 2008

(51) Int. Cl.
*H02G 1/08* (2006.01)
(52) U.S. Cl. .................. 254/134.3 FT; 254/134.3 R
(58) Field of Classification Search .......... 254/134.3 R, 254/134.3 FT
See application file for complete search history.

(56) References Cited

U.S. PATENT DOCUMENTS

| | | | |
|---|---|---|---|
| 1,946,037 A | 2/1934 | Scott | |
| 2,930,584 A | 3/1960 | Hensley | |
| 3,078,073 A | 2/1963 | Zizzo | |
| 3,971,543 A | 7/1976 | Shanahan | |
| 4,572,561 A * | 2/1986 | Hale | 294/65.5 |
| 5,522,630 A | 6/1996 | James | |
| 6,824,329 B2 * | 11/2004 | Van Bijsterveld et al. | 405/184 |
| 7,051,999 B2 * | 5/2006 | Hewitt | 254/134.3 R |
| 7,093,822 B2 * | 8/2006 | Welker | 254/134.3 R |
| 2006/0284150 A1 * | 12/2006 | Spadaro et al. | 254/134.3 FT |
| 2008/0048160 A1 * | 2/2008 | Kim | 254/134.3 FT |

* cited by examiner

*Primary Examiner*—Lee D Wilson
(74) *Attorney, Agent, or Firm*—Furr Law Frim; Jeffrey M. Furr, Esq.

(57) ABSTRACT

The invention is a device for running a line under carpet, through drywall, or through any other thin, non-magnetic barrier. The device uses a strong super magnet that is attached to a handle, which also serves as a storage container for the line pulling device, as well as a mechanism to pull the line with adequate force without causing pain to the puller's hands.

1 Claim, 7 Drawing Sheets

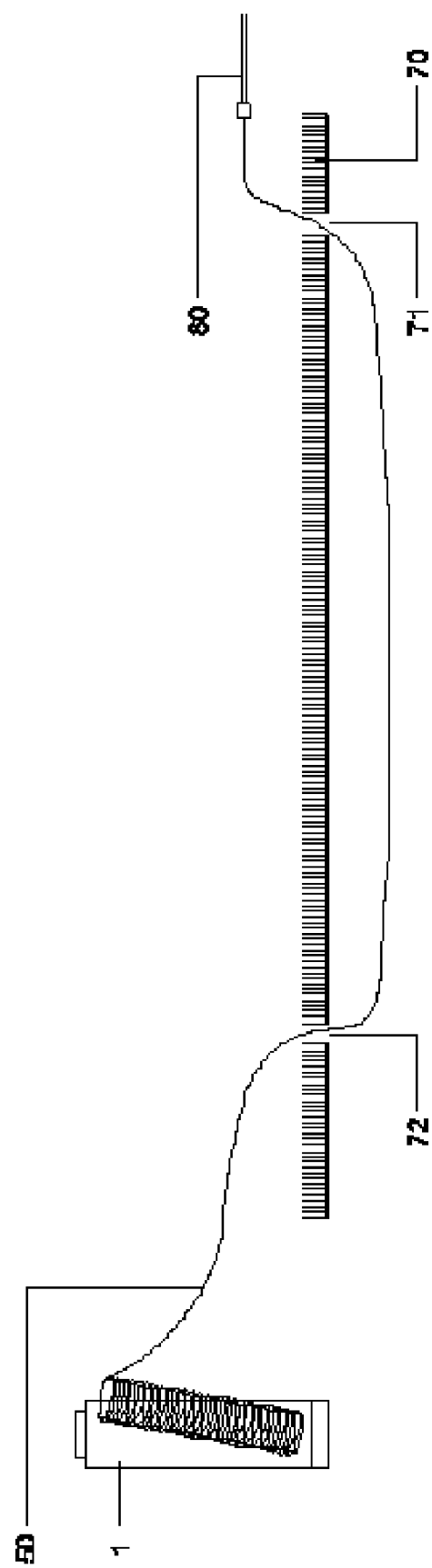

CABLE PULLER

BACKGROUND OF INVENTION

This invention relates to a device for running a line under carpet, through drywall, or through any other thin, non-magnetic barrier and in particular using a magnetic field to do this.

BACKGROUND

Prior art includes electrician's fish tape for laying flat wires under the carpet when the carpet is laid down. Other methods include using flat cable that is pasted to the wall and painted over, or going through the subfloor and through the drywall.

U.S. Pat. No. 5,522,630 by James and issued on Jun. 4, 1996, is for a fishing tool for magnetic objects. It discloses a tool for fishing magnetic objects through a wall that includes a body portion that has a cavity formed therein. An electromagnet is secured in the cavity and is connected to a variable power source that is adapted to selectively activate the electromagnet. This is not specifically designed or easy to use for the pulling of cables and wires, particularly under carpeting.

U.S. Pat. No. 3,971,543 by Shanahan and issued on Jul. 27, 1976, is for a tool and kit for electrical fishing. It discloses a tool for fishing electrical wires through walls that includes a magnetically attractable sensor assembly having a contactor element secured through a connecting sleeve to one end of a length of chain. The other end of the chain carries a fastener member which can be secured to a line or wire or the like for suspending the sensor assembly within a wall. A substantially hollow cylindrical member which serves as a housing for the sensor assembly when the tool is not in use has a magnet fixed within one end thereof. In use, the end of the cylindrical housing member which carries the magnet is inserted through a small hole in the wall to attract the sensor assembly which is suspended within the wall. This system can be difficult to use and is limited in its scope of use.

U.S. Pat. No. 3,078,073 by Zizzo and issued on Feb. 19, 1963, is for an electrical wire finder. U.S. Pat. No. 2,930,584 by Hensley, et al. and issued on Mar. 29, 1960, is for a method and apparatus for inserting wires in conduits. U.S. Pat. No. 1,946,037 by Scott and issued on Feb. 6, 1934, is for an electric fish wire. All of these systems are difficult to use.

There still exists a need for a cable puller that is quick and easy for pulling a cable or wire under a surface such as carpeting.

SUMMARY OF INVENTION

The current invention is a device for running a line under carpet, through drywall, or through any other thin, non-magnetic barrier. This is done in order to pull wires through; under the carpet, through the wall, etc. It has a strong super magnet that is attached to a handle, which also serves as a storage container for the line pulling device, as well as a mechanism to pull the line with adequate force without causing pain to the puller's hands.

BRIEF DESCRIPTION OF DRAWINGS

Without restricting the full scope of this invention, the preferred form of this invention is illustrated in the following drawings:

FIG. 7 shows the cable being pulled.

DETAILED DESCRIPTION

The following description of a cable and wire puller device is demonstrative in nature and is not intended to limit the scope of the invention or its application of uses.

There are a number of significant design features and improvements incorporated within the invention.

The current invention is a device for running a line, wire or cable under carpet, through drywall, or through any other thin, non-magnetic barrier. This is done in order to pull wires through; under the carpet, through the wall, etc. It is a strong super magnet that is attached to a handle, which also serves as a storage container for the line pulling device, as well as a mechanism to pull the line with adequate force without causing pain to the puller's hands.

Figure 1:
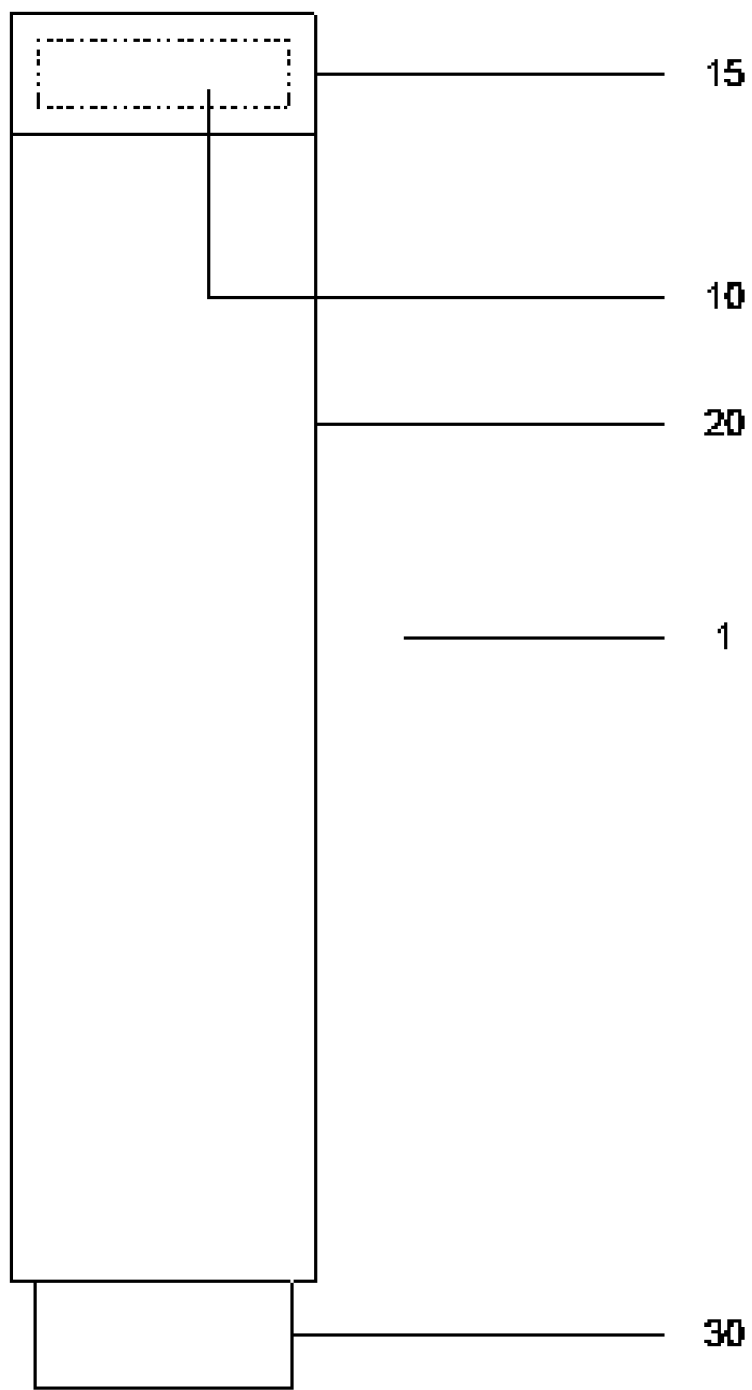
FIG. 1 shows a front view of the device.
Figure 2:
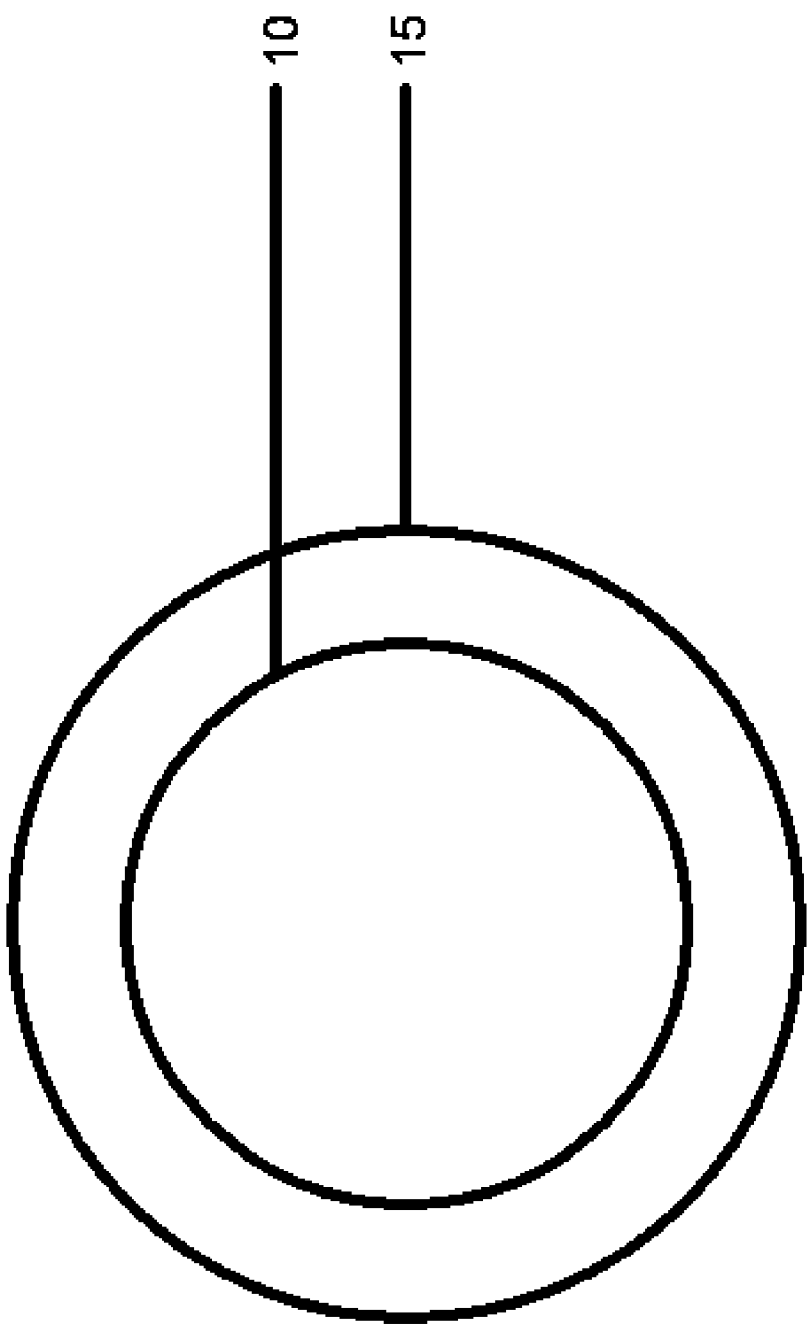
FIG. 2 shows a top view of the device.

As shown in FIG. 1, the device 1 has a strong super magnet 10 that is in a magnet housing 15. This magnet housing 15 is attached to one of the ends of the body 20. The magnet housing 15 is on the top end of body 20 as shown in FIG. 2.

The body 20 is cylindrical in shape and has a textured surface to allow it to be used in the pulling line 50 if needed. The body 20 serves as a storage container for the line pulling device. The body 20 serves as a storage container for the line pulling device The body 20 serves as a mechanism to pull the line with adequate force without causing pain to the puller's hands. The body 20, in the preferred embodiment, is made of a sturdy plastic material and is design to fit the user's hand.

Figure 3:
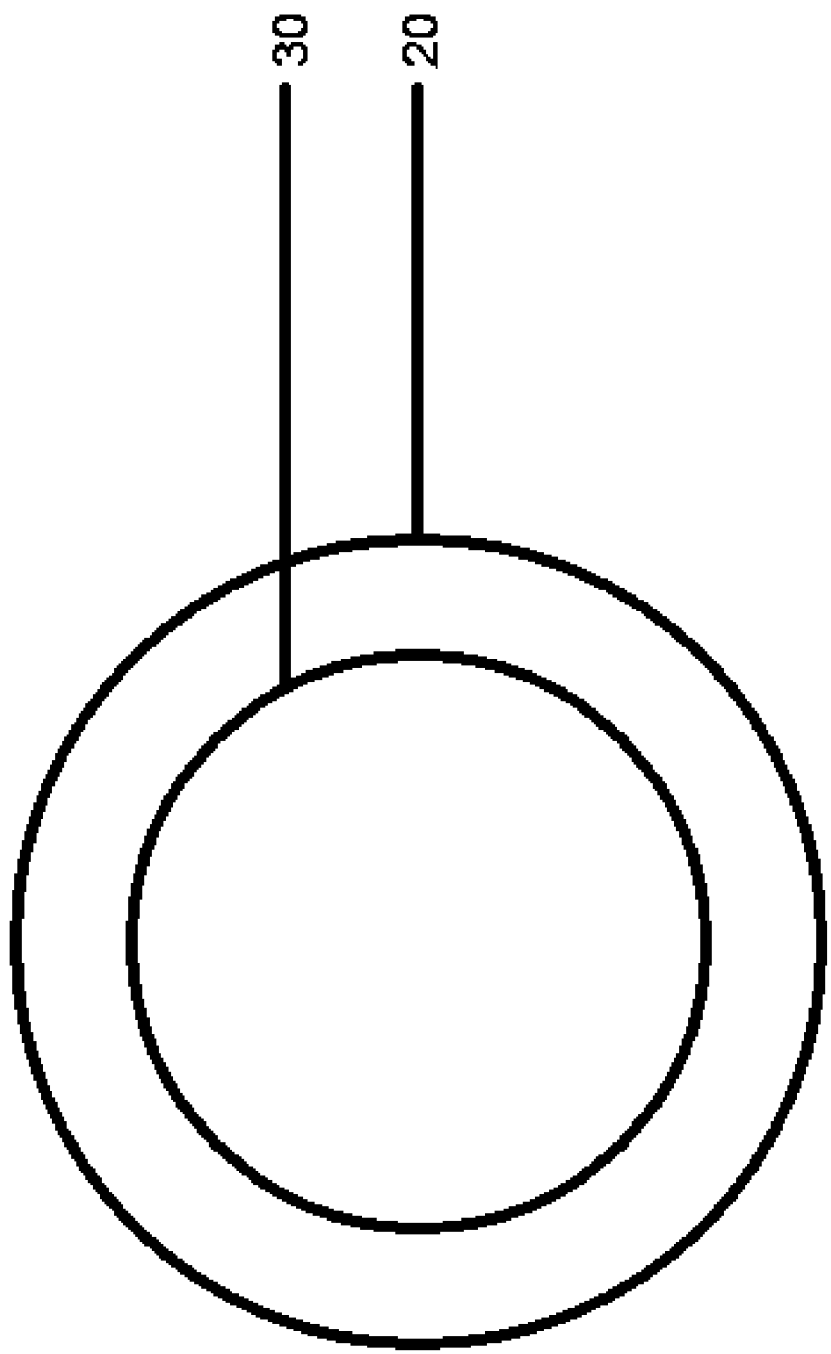
FIG. 3 shows a bottom view of the device.
Figure 4:
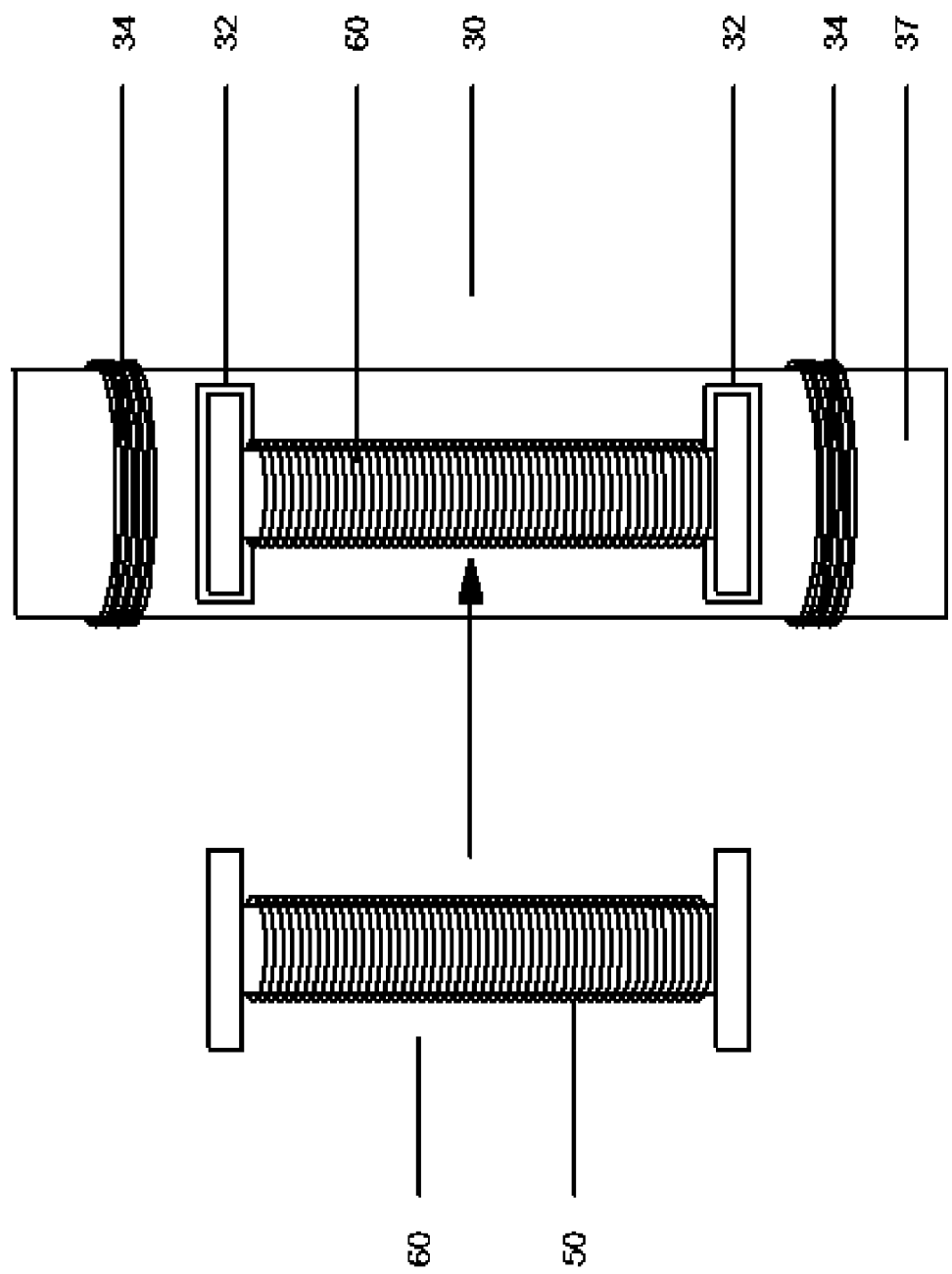
FIG. 4 shows a view of the detached inner housing.

As shown in FIG. 3, the bottom of the body 20 has the inner housing 30. The inner housing 30 holds the mole 40, line 50 and spool 60 and is detachable from the body. In the preferred embodiment, the inner housing 30 unscrews from the body 20. FIG. 4 shows a view of the inner housing 30 detached (unscrewed) from the body 20 of the device 1. It is also a view of the spool 60 and line 50 detached from the inner housing 30. The inner housing 30 serves as a container for the spool 60, the line 50 and the mole 40.

The inner housing 30 holds the spool 60 through a holding means such as grooves 32. The inner housing 30 has threads 34 which are used to screw the inner housing 30 to the body 20. The spool 60 is contained in the opening 35 of the inner housing 30. The spool 60 fits into the grooves 32 of the inner housing 30. The spool 60 is a standard spool with the line 50 placed around the spool 60. The inner housing 30 has a mole storage area 37 where the mole 40 is stored and hidden.

Figure 5:
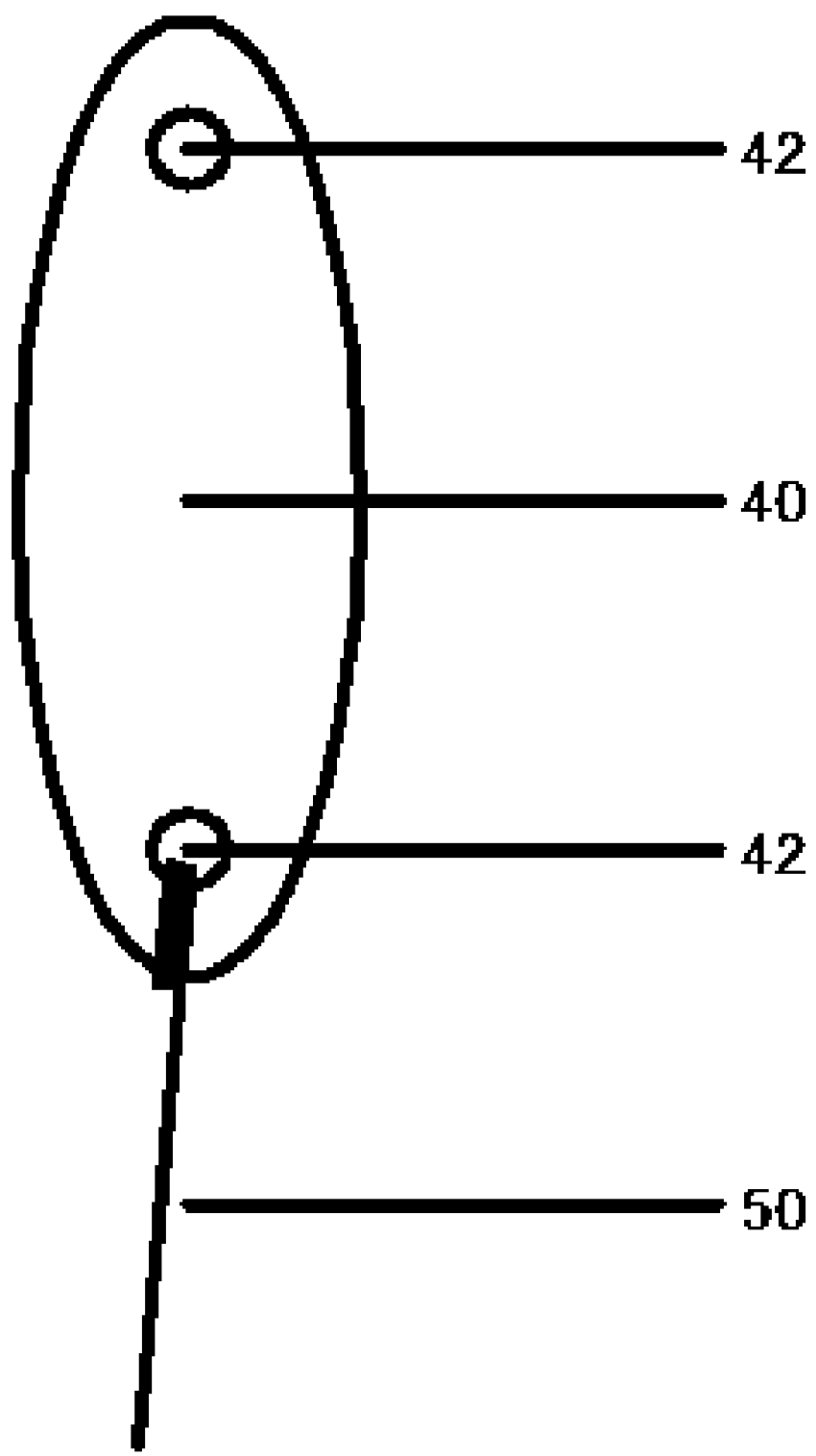
FIG. 5 shows the mole.

The mole 40, as shown in FIG. 5, is in a long elliptic shape with holes 42 on the two points to attach to the line 50. The mole 40 is used to pull the line 50. In the preferred embodiment, the mole 40 will have a concave side where a magnet would be inserted and a covered side. The covered side would be covered with a friction resistance material to aid in sliding the mole 40 along a surface. In the preferred embodiment, the mole would be made of a magnetic material such as steel.

The line 50 would be made of a heavy strength line.

Figure 6:
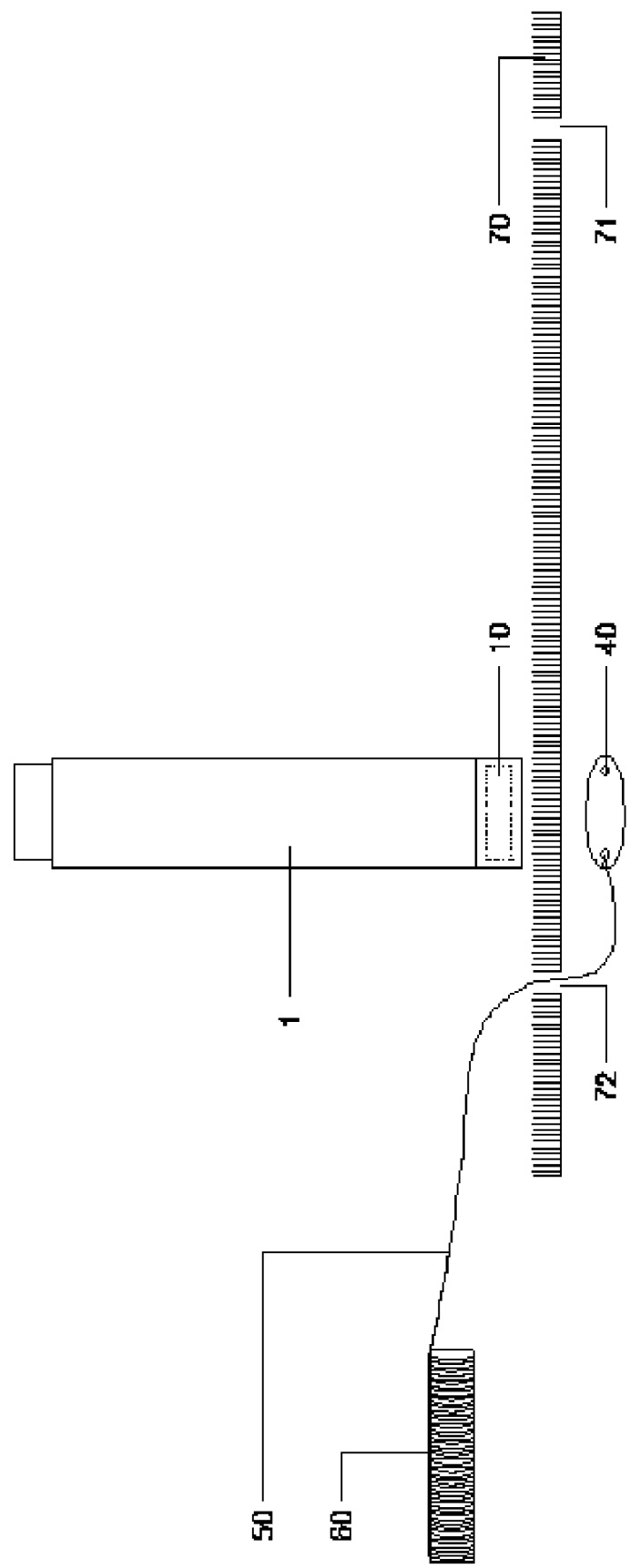
FIG. 6 shows the device being used under carpeting.

As shown in FIG. 6, in order to get a wire or cable 80 from one area of a covering such as carpet 70 to another, a hole 71 is made at the desired wire location. Another hole 72 is made at a starting point. The starting point is chosen based on its convenience. The line 50 is attached to the mole 40. The mole 40 is then placed into the starting hole 72. The device 1 is held so that the magnet 10 is attracted to the mole 40. The device 1 is then moved towards the hole 71 at the desired wire location. In the case of carpeting or similar such covering, the carpeting will tent upwards due to the magnetic attraction of the mole 40 to the magnet 10 allowing for easier movement of the mole 40. The mole 40 is brought to and out of the finish hole 71. The cable or wire 80 is attached to the line 50 at the finish hole 71 and pulled by the line 50 back to the starting hole 72.

After the line 50 has been guided from the starting hole 72 to the desired wire location hole 71 as shown in FIG. 6, and after the mole 40 has been disconnected from the line 50, the mole is attached to the cable or wire 80. FIG. 7 shows the cable or wire 80 attached to the line 50 in order to be pulled under the carpet 70 first through the desired wire location hole 71 and finally through the starting hole 72. Then, in the preferred embodiment, the line 50 is wrapped around the body 20 and pulled back to the starting hole 72. After the cable or wire 80 passes through the starting hole 72, the line 50 is disconnected from the wire or cable 80

This method can be used for pulling wire or cable through walls or ceiling or any such desired surface and location.

ADVANTAGES

The device allows for a home stereo system's surround speakers to be installed under the carpet with no cables visible and without shoving wires under the molding. A phone installer could just run a jack to any location in a living room without exiting and re-entering the house, or again using the molding as a disguise. Other applications also include running network cable under carpet. Coaxial cable could also be used.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A device for pulling comprising: a body with a magnet in a magnet housing attached with an inner housing that has a cover on an opposite end from said magnet adjacent said inner housing which is removable from said body where said inner housing has internally a spool attached to a line, and a magnetic mole; wherein with a plurality of holes where said line is attached to said mole, where said mole will have a plurality of holes and a covered side and a concave side and wherein the inner housing holds the mole, line and spool and is detachable from the body by unscrewing the cover from the body which allows said body to magnetically move the mole pulling the line on the spool when said mole is repositioned outside of the body.

* * * * *